United States Patent [19]

MacIvergan

[11] Patent Number: 4,821,500
[45] Date of Patent: Apr. 18, 1989

[54] RAKING MEANS

[76] Inventor: Robert G. MacIvergan, 422 Long Leaf Acres Dr., Wilmington, N.C. 28405

[21] Appl. No.: 123,050

[22] Filed: Nov. 19, 1987

Related U.S. Application Data

[63] Continuation-in-part of Ser. No. 909,787, Nov. 17, 1986, abandoned.

[51] Int. Cl.⁴ ............................................. A01O 7/00
[52] U.S. Cl. .............................. 56/400.14; 56/400.01
[58] Field of Search .................... 56/400.01–400.21; D8/13

[56] References Cited

U.S. PATENT DOCUMENTS

| | | | |
|---|---|---|---|
| 220,420 | 4/1971 | Rothwell | D8/13 |
| 736,878 | 8/1903 | Reis | 56/400.19 |
| 1,014,250 | 1/1912 | Norman | 56/400.21 |
| 1,591,738 | 7/1926 | Bell | 56/400.21 |
| 1,768,080 | 6/1930 | Kurihara | 56/400.21 |
| 2,065,830 | 12/1936 | Shermann | 56/400.21 |
| 2,164,233 | 6/1939 | Dubbs | 56/400.21 |
| 2,463,393 | 3/1949 | Key | 56/400.21 |
| 3,374,614 | 3/1968 | Dacheux | 56/400.14 |
| 4,516,393 | 5/1985 | Lambert | 56/400.19 |

FOREIGN PATENT DOCUMENTS

| | | | |
|---|---|---|---|
| 454899 | 3/1949 | Canada | 56/400.17 |
| 91371 | 2/1938 | Sweden | 56/400.15 |

*Primary Examiner*—John Weiss
*Attorney, Agent, or Firm*—Rhodes, Coats & Bennett

[57] ABSTRACT

A lawn rake is disclosed which comprises a main body portion supported by wheels. A plurality of broad, closely spaced gathering tines formed from a sheet of spring steel or other resilient material extend downwardly and rearwardly from the main body portion. These tines are forwardly disposed at their lower end to engage the ground to gather pine needles, grass clippings and leaves when the rake is pushed forward, and to pass over such debris when the rake is pulled backward. When the rake is pulled backward, debris previously gathered by the gathering tines is transferred to a second set of tines disposed forwardly of the gathering tines. These pusher tines keep the gathered pine needles, grass clippings, etc., in front of the gathering tines thereby preventing the same from clogging with debris.

8 Claims, 3 Drawing Sheets

ID
RAKING MEANS

This is a continuation-in-part application of Ser. No. 909,787, filed Nov. 17, 1986, now abandoned.

BACKGROUND OF THE INVENTION

To maintain a well-groomed lawn it is necessary to periodically fertilize and aerate the lawn, to cut the grass frequently, and to remove debris such as grass clippings, pinestraw and leaves. Many devices have been developed to assist in caring for lawns. For instance, power lawn mowers and weed eaters make cutting the grass a relatively inarduous task. Aerators likewise simplify the task of aerating the lawn. The application of fertilizers, lime or seed to the lawn is made easy by broadcast spreaders and drop spreaders. However, for most Americans, the task of raking the lawn is as arduous today as it ever was.

Devices are known which decrease the frequency at which the lawn must be raked. Lawn mowers come equipped with bags which gather clippings. Also, blowers powered by gasoline engines have recently been introduced which use air to sweep the lawn free of leaves. None of these devices, however, have completely supplanted the lawn rake or eliminated the necessity for its use.

SUMMARY AND OBJECTS OF THE INVENTION

The present invention is a lawn rake which has been developed to make the task of raking the lawn less arduous and less time consuming. The lawn rake includes a frame mounted between two wheels. Two sets of tines are secured to the frame, each of which serves a distinct function.

The rear gathering tines, which are broad and closely spaced, are formed from a sheet of spring steel or other resilient material. The gathering tines extend downwardly and rearwardly from the frame and then curve forwardly so that the raking end of the gathering tines form an acute angle with the ground. The raking end of the gathering tines engage the ground to collect grass clippings, pine needles and leaves as the device is pushed forward. As the lawn rake is pulled backward, the gathering tines pass over debris which was not collected on the first pass without any accumulation on the backside thereof.

The primary function of the front pusher tines is to keep debris in front of the gathering tines so that the gathering tines do not become clogged. The pusher tines are hinged to rotate forwardly when the lawn rake is pulled backward. This allows the pusher tines to pass over the debris which was collected by the gathering tines during the last forward movement. When the lawn rake is pushed forward, the pusher tines return to a substantially vertical position and keep the collected debris away from the gathering tines.

From the foregoing, it is apparent that the primary object of the present invention is to provide a lawn rake which makes the task of raking a lawn less arduous and less time consuming.

Another object of the present invention is to provide a lawn rake which collects grass clippings, pine needles, leaves and other debris with greater efficiency than can be achieved using an ordinary hand rake.

Another object of the present invention is to provide a lawn rake which is constructed so that the tines are less susceptible to becoming clogged with debris and thereby rendered useless until the tines are cleared of such debris.

Another object of the present invention is to provide a lawn rake which is sturdy in construction and which has a relatively long useful life.

Other objects and advantages of the present invention will become apparent and obvious from a study of the following description and the accompanying drawings which are merely illustrative of such invention.

DETAILED DESCRIPTION OF THE INVENTION

Figure 1:
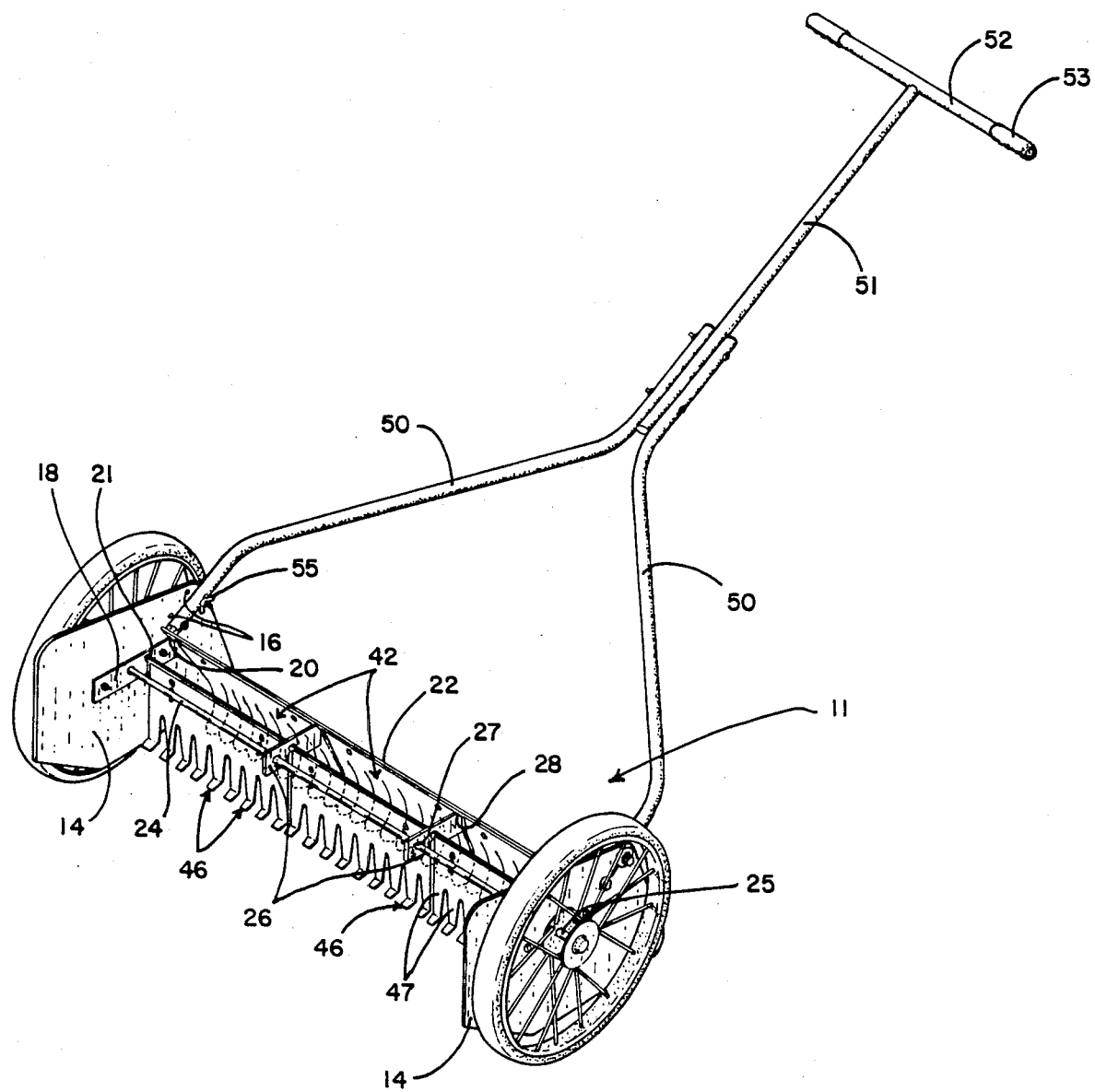
FIG. 1 is a perspective view of the lawn rake of the present invention.

Referring now to the drawings, the lawn rake of the present invention is shown therein and indicated generally by the numeral 10. Lawn rake 10 includes a frame 11 supported by a pair of wheels 12. The frame 11 in turn supports two sets of tines as will be subsequently described. A handle portion 13 is secured to the frame 11 for pushing the lawn rake 10 across the lawn.

Referring now to frame 11, the same includes two side plates 14 spaced approximately 30 inches apart. The side plates 14 have a generally trapezoidal configuration. An axle opening (not shown) is formed near the center of each side plate 14. Also, two pairs of handle openings 16 are formed in the upper rear portion of each side plate 14 for securing handle 13 to the side plates 14.

Secured to the inside of each side plate 14, by weldment or other suitable means, is a pusher tine support plate 18. Axle openings (not shown) are formed in the pusher tine support plates 18 which align with axle openings in side plates 14. The rear end of each support plate 18 includes a bevelled upper corner which is indicated at 20. A tine bar opening 21 is formed in each support plate 18 between the axle opening and the bevelled corner 20. The purpose of the tine bar opening 20 is to support the front tine support bar 36 as will be hereinafter described.

Frame 11 further includes a rear tine support bar 22 and a tubular member 24 which extend between and interconnect the side plates 14. The ends of the rear tine support bar 22 are secured to respective side plates 14 by weldment, and rest against the bevelled corners 20 of support plates 18. Thus, rear support bar 22 is disposed at an angle with respect to the ground. A series of openings (not shown) are formed in the rear tine support bar 22 and spaced between the side plates 14 to allow the rear gathering tine assembly 42 to be bolted to the support bar 22.

Figure 4:
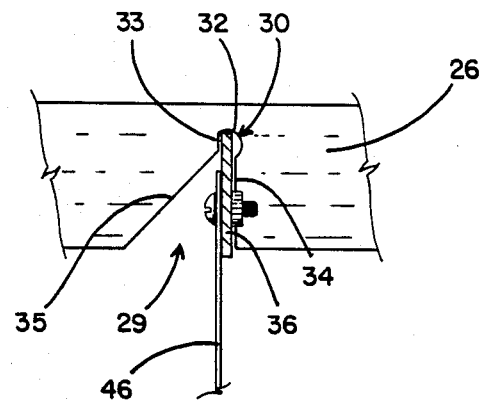
FIG. 4 is a partial section view thereof showing the tine bar mounting bracket.

The tubular member 24 aligns with the axle openings in the side plates and support plates. The ends of the tubular member 24 are welded to respective support plates 18 as best seen in FIG. 4. An axle 25 is journaled within tubular member 24. The ends of the axle 25 project through the axle openings and have wheels 12 rotatively mounted thereon.

A pair of pusher tine mounting brackets 26 interconnect the tubular member 24 and rear tine support bar 22.

The pusher tine mounting brackets 26 include an opening 27 in the forward end thereof through which tubular member 24 extends. The pusher tine mounting brackets 26 further include a bevelled rear corner 28 which is welded to the rear tine support bar 22.

Figure 5:
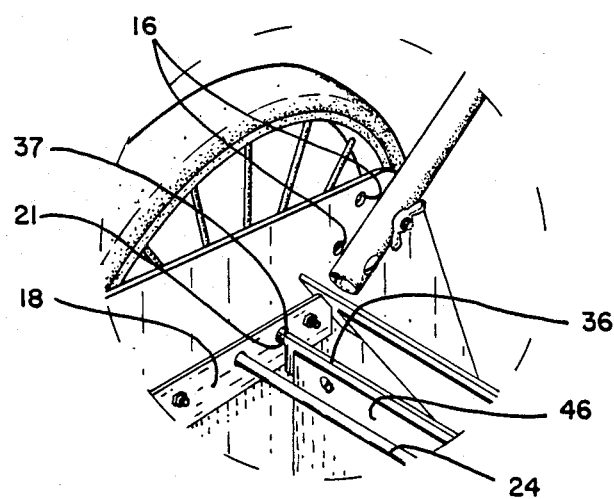
FIG. 5 is a partial perspective view thereof.

A tine bar cut out 29 is formed in the lower edge of the mounting brackets 26, between the tubular member 24 and rear tine support bar 22. (See FIG. 5). The tine bar cut out 29 includes a generally circular upper portion 30 and a wedge shaped lower portion 31. The upper portion 30 has an arc-shaped edge 32 and a vertical forward edge 33. The lower portion 31 includes a vertical rear edge 34 and an angular front edge 35.

The top edge of a front tine support bar 36 extends through the cut-outs 29 in the mounting brackets 26. The front tine support bar 36 is supported by tab-like projections 37 on each end. The tab-like projection 37 extend into the tine bar openings 21 in respective support plates 18. If not for mounting brackets 26, the front tine support bar 36 would freely pivot in the tine bar openings 21. However, because the top edge 38 of support bar 36 passes through the cut-outs 29 in mounting brackets 26, the rotation of the support bar 36 is limited. In particular, the rear edge 34 and vertical edge 33 of cut-outs 29 cooperate to prevent the support bar 36 from rotating backward beyond a substantially vertical position. (See FIG. 5). The front edge 35 of cut-outs 29 prevent the support bar 36 from swinging forward more than approximately 45 degrees.

Referring back again to FIG. 1, it is seen that two tine assemblies, 42 and 46, are supported from frame 11. The gathering tine assembly 42 comprises one or more sheets of resilient spring steel having a plurality of gathering tines 43 formed along one edge thereof. A series of openings are formed along the upper edge of the gathering tine assembly 42 for bolting the tine assembly 42 to the rear tine support bar 22 as indicated at 46. The gathering tines 43 are formed by cutting a plurality of narrow slots 44 into the lower edge of a sheet of spring steel, which extend approximately two-thirds the distance to the upper edge. The raking ends 45 of the gathering tines 43 are pointed, thus forming, when viewed as a whole, a substantially continuous, serrated edge.

Figure 2:
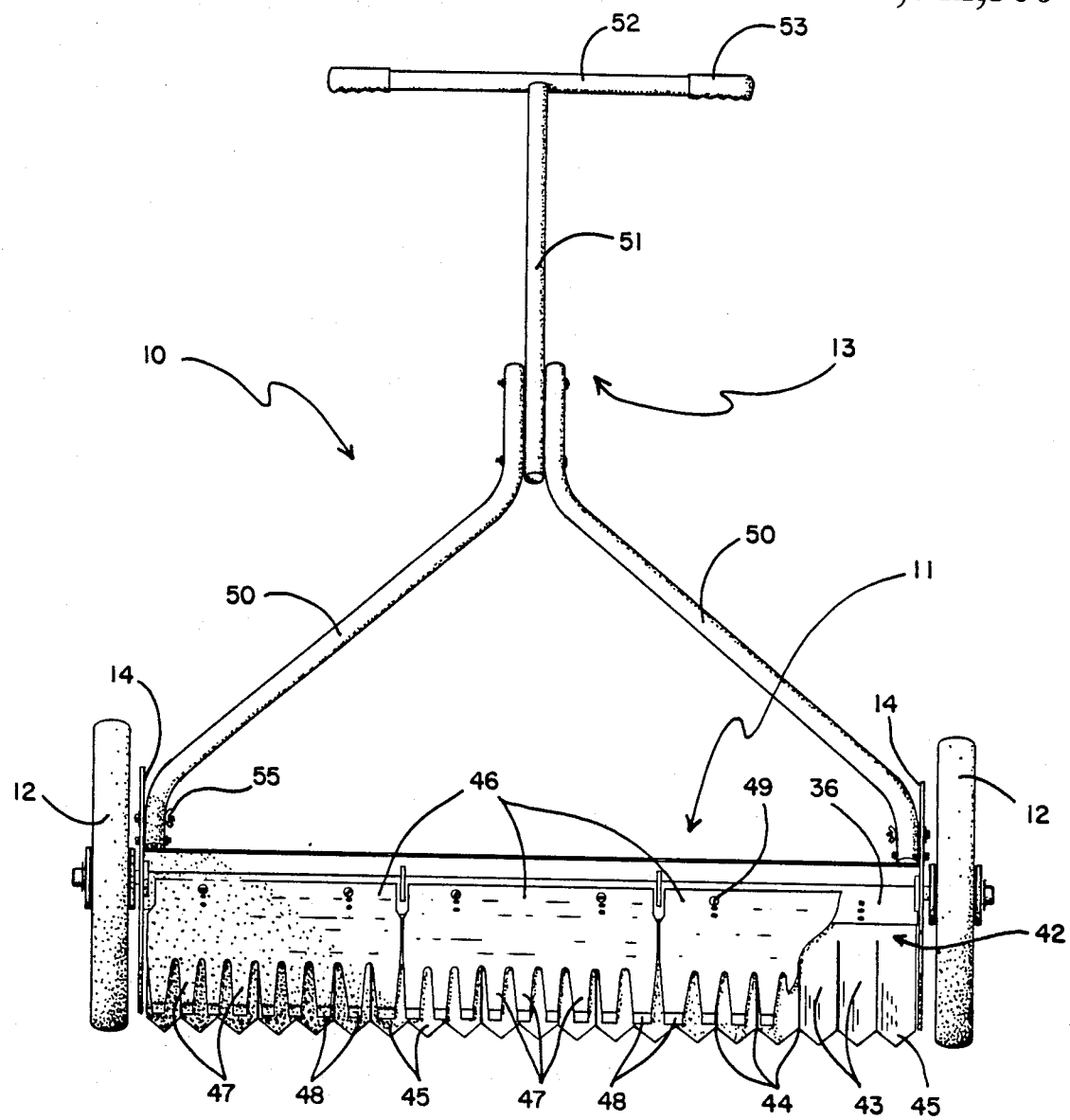
FIG. 2 is a side elevational view thereof.
Figure 3:
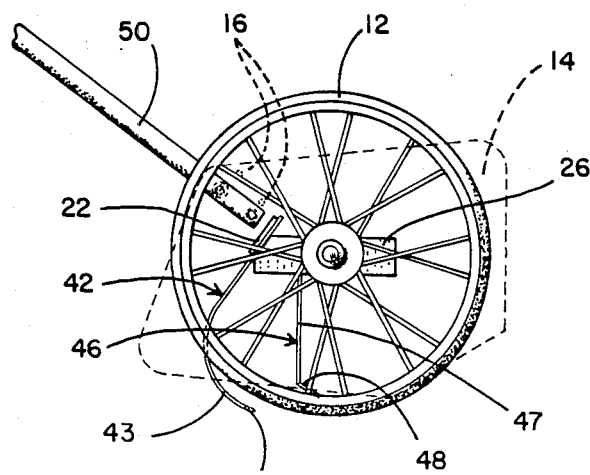
FIG. 3 is a front elevational view thereof.

The broad gathering tines 43 have a curved profile which define an elongated pocket on the front side of the gathering tines 43 (see FIG. 2). At the upper end, the gathering tines 43 extend downward and towards the rear of the lawn rake 10. The gathering tines 43 then curve forward so that the raking ends 45 of the gathering tines 43 project forward at an acute angle. The raking ends 45 therefore work against the ground when the lawn rake 10 is pushed forward. The forward orientation of the raking ends 45 is extremely important since it causes grass clippings, pine needles, etc., to accumulate in the elongated pocket on the front side of the gathering tines 43 when the rake is pushed forward. When the rake is pulled backward, the gathering tines 43 flex slightly upward and pass over such debris so that there is no accumulation on the back side of the gathering tines 43.

The pusher tine assembly 46, also formed of spring steel, includes a plurality of pusher tines 47, each having a forwardly bent tip 48. The pusher tines 47 are spaced apart more widely than the gathering tines 43. A series of openings are formed along the upper edge of the pusher tine assembly 46 for bolting the same to the front tine support bar 36 as indicated at 49. It is appreciated, therefore, that the pusher tine assembly 46 will rotate with the support bar 36.

Referring now to the handle portion 14 of lawn rake 10, the same includes two arcuate members 50 which are secured at their lower ends to respective side plates 14. An intermediate tube 51 is sandwiched between the upper ends of the arcuate members 50 and secured by conventional nuts and bolts. The handle grip tube 52 is secured to the intermediate tube 51 by weldment and forms a tee with the intermediate tube 51. Handle grips 53 are placed over each end of the handle grip tube 52.

The arcuate members 50 can be secured to the side plate 14 using either pair of handle openings 16 by a conventional bolt and wing nut assembly 55. This provides means for adjusting the height and angle of the handle portion 13. The handle adjustment can be used to accommodate different sized people or to change the amount of bite of the gathering tines 43.

To use the lawn rake 10 of the present invention, the handle grips 53 are grasped and the handle portion 13 picked up to a comfortable position. The lawn rake 10 is pushed forward approximately five feet then pulled rearward approximately two and one-half feet. When the rake 10 is pushed forward, the gathering tines 43 will be kept in engagement with the ground by the resiliency of the spring steel. During this forward movement, the raking ends 45 will collect grass clippings, pine needles, etc., which will accumulate on the front side of the gathering tines 43 in the elongated, concave pocket.

When the lawn rake 10 is pulled rearward, the gathering tines will bend forward slightly. However, due to the orientation of the raking ends 45, the gathering tines 43 will pass over any debris which was left on the ground without disturbing the same and without causing the debris to accumulate on the back side of the gathering tines 43. Thus, debris which was missed on the first pass can be accumulated on the subsequent pass. An additional advantage of the orientation of the gathering tines 43 is that any grass clippings, pine needles or other debris which has become entangled in the gathering tines 43, will be stripped from the narrow slots 44 between the gathering tines 43 as the lawn rake 10 is pulled backward.

The pusher tines 47 will push the majority of the load (i.e., accumulated grass clippings, pine needles, etc.) ahead of the gathering tines 43 so that the gathering tines 43 always remain free of debris. The pusher tines 47 are hinged to pivot forward when the lawn rake 10 is pulled backward, so that the pusher tines 47 easily pass over the debris accumulated by the gathering tines 43. After passing over the debris, the pusher tines 47 return to a substantially vertical position. In this manner, the debris which is collected by the gathering tines 43 during the forward movement is transferred to the pusher tines 47 during the next succeeding rearward movement. Because the debris is already disentangled from the ground cover by the gathering tines 43, it is not necessary for the pusher tines 47 to vigorously engage the ground. In fact, a certain amount of clearance between the pusher tines 47 and the ground is desirable, which clearance can be adjusted as needed depending upon the ground cover.

The present invention has the advantage of being relatively simple in construction yet highly efficient in removing debris from a lawn. The successive forward and backward movements assures that debris which is not collected on the first pass will be picked up on the subsequent pass. Further, the use of a second set of tines forward of the gathering tines greatly reduces the chance that the gathering tines will become clogged with debris.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A lawn rake comprising: a frame; a pair of wheels supporting the frame; a handle extending generally upwardly from the frame; a plurality of broad, resilient gathering tines laterally spaced between the wheels so as to form a substantially continuous row, said gathering tines having an upper end portion secured to the frame and a raking end engaged with the ground for collecting debris, said gathering tines further having a concave profile forming an elongated pocket on the front side of the gathering tines where debris collected by the gathering tines is accumulated; a plurality of laterally spaced pusher tines secured to the frame and disposed forward of the gathering tines, said pusher tines being normally disposed in a substantially vertical position; means for allowing said pusher tines to pivot forward when the rake is pulled backward to permit the debris accumulated by the gathering tines to pass thereunder and return to its normal substantially vertical position when the rake is pushed forward so that the previously accumulated debris is pushed ahead of gathering tines by the pusher tines.

2. The lawn rake of claim 1 wherein the raking end of the gathering tines is disposed at such an angle with respect to the ground that it accumulates debris when moved forward and passes over debris when moved backward.

3. The lawn rake of claim 2 wherein the raking end of the gathering tines form an acute angle with the ground behind the gathering tines.

4. The lawn rake of claim 3 wherein the upper end portion of the gathering tines extend downwardly and rearwardly from the frame and wherein the gathering tines include an intermediate portion which bends forward as it extends from the upper end portion of the gathering tines to the raking end of the gathering tines.

5. The lawn rake of claim 1 wherein the frame includes a pair of side retaining plates disposed at opposite ends of the row of gathering tines to prevent accumulated debris from escaping around the end of the row of gathering tines.

6. A lawn rake comprising: a frame having an upwardly extending handle; a pair of spaced apart wheels to enable the frame to be rolled forward and backward; a plurality of broad, closely spaced, resilient gathering tines secured to the frame and laterally spaced between the wheels so as to form a substantially continuous row, each of the gathering tines having a curved profile terminating in a forwardly disposed raking end engaged with the ground for disengaging and collecting debris when the rake is rolled forward, wherein the gathering tines collectively define an elongated pocket on the front side of the gathering tines where debris collected by the gathering tines is initially accumulated; a plurality of pusher tines mounted to the frame forward of the gathering tines for pushing the disengaged debris ahead of the gathering tines when the rake is rolled forward; and means for transferring the debris disengaged and accumulated by the gathering tines to the pusher tines when the rake is rolled backward.

7. The lawn rake according to claim 6 wherein the transfer means includes means for pivotally mounting the pusher tines to the frame so that the pusher tines pivot from a normal vertical position to a forward inclined position when the rake is pulled backward thereby allowing debris to pass under the pusher tines, and to pivot from the forward inclined position to the normal vertical position after passing over debris so that when the rake is pushed the pusher tines engage the previously collected debris and push it ahead of the gathering tines.

8. The lawn rake according to claim 6 wherein the frame includes a pair of side retaining plates disposed at opposite ends of the row of gathering tines to prevent accumulated debris from escaping around the end of the row of gathering tines.

* * * * *